United States Patent Office 3,459,707
Patented Aug. 5, 1969

3,459,707
PROCESS FOR THE DECOMPOSITION OF FORMIC ACID IN MIXTURES OF ACETIC ACID AND FORMIC ACID
Percy Hayden and John Charlton, Norton-on-Tees, England, assignors to Imperial Chemical Industries Limited, London, England, a corporation of Great Britain
No Drawing. Filed Apr. 4, 1966, Ser. No. 539,660
Claims priority, application Great Britain, May 7, 1965, 19,403/65
Int. Cl. C07c 53/08, 51/42
U.S. Cl. 260—541　　　　　　　　　　　　　11 Claims

ABSTRACT OF THE DISCLOSURE

Formic acid contained in formic acid/acetic acid mixtures is selectively oxidized by contacting the mixture in the liquid phase with oxygen in the presence of a soluble compound of a platinum group metal and a redox system.

This invention concerns the catalytic and selective decompositions of formic acid.

It is difficult and practically impossible to remove formic acid from aqueous formic acid and acetic acid mixtures by distillation. The purpose of this invention is the provision of a process for selectively decomposing formic acid in mixtures containing formic acid and acetic acid; other carboxylic acid or acids, such as aliphatic acids containing 2 to 8 carbon atoms, may also be present in the mixture.

According to the invention a process for decomposing formic acid in mixtures containing formic acid and acetic acid comprises contacting the mixture in the liquid phase with molecular oxygen in the presence of a catalyst comprising a soluble compound of a platinum group metal and a redox system which is capable of preventing precipitation of said metal, at a temperature such that formic acid is selectively oxidized. The platinum group metals are platinum, palladium, rhodium, osmium, iridium and ruthenium. Palladium compounds are particularly preferred.

The redox system may be organic or inorganic in nature. Preferred organic systems are obtained with para-benzoquinone, duraquinone or 2-ethylanthraquinone. Preferred inorganic systems are obtained with cupric and ferric salts in the presence of oxygen, cupric salts being particularly preferred. Advantageously the cupric salt of the acid other than formic acid in the mixture may be used, e.g. cupric acetate in the case of mixtures of formic and acetic acids. Alternatively, cupric chloride or mixtures of cupric chloride and a carboxylic acid salt e.g. cupric acetate, may be employed. The oxygen partial pressure may advantageously be 1 to 50 p.s.i.

The oxidation is effective with water present, 20% w./w. or more water being tolerable but an upper limit of 10% w./w. is preferred.

It is preferred to oxidize the formic acid as formate ions which may be made in situ by adding a base. Any base which does not poison the catalyst would be effective but, advantageously an alkali metal, alkaline earth metal or ammonium carboxylate is used, particularly a carboxylate which corresponds to an acid other than formic acid in the mixture, such as an acetate. Lithium acetate is a preferred base. The concentration of the base is preferably in the range 0.5 to 5 moles/liter, particularly about 2 moles/liter.

Palladium salts are particularly useful as catalysts in this process, the preferred salt being palladous chloride; examples of other suitable salts are the other halides, such as palladous bromide, and carboxylates, such as palladous acetate.

It is preferred that a halide, such as lithium or sodium chloride, is also present in the reaction mixture, particularly when palladous carboxylates are used or when the palladous halide is present in small quantities.

Whilst larger concentrations may be employed it is preferred that the molar concentration of the platinum group metal compound be less than 0.5, particularly in the range $10^{-5}$ to $5 \times 10^{-3}$. Particularly suitable molar concentrations of the cupric or ferric salts are 0.1 to 0.5 and of the alkali metal halide 0.03 to 1.0 or more preferably 0.05–0.2 M.

Soluble iridium compounds are also very effective catalysts in this process, particularly chloriridic acid. In this case the oxygen present is sufficient to prevent precipitation of the iridium metal so that it is not necessary to add a further redox compound.

The temperature at which the selective decomposition of formic acid is carried out is preferably between 80° and 140° C. although higher temperatures, e.g. up to 180° C., could be used, providing the pressure is sufficient to maintain liquid phase.

The following examples illustrate the invention.

EXAMPLE 1

1 liter of a catalyst having the following composition in acetic acid

|   | Moles/liter |
|---|---|
| Palladous chloride | $5 \times 10^{-3}$ |
| Lithium chloride | 0.15 |
| Lithium acetate | 2.0 |
| Cupric acetate | 0.1 | was placed in a 2″ diameter Hastelloy C reactor and maintained at a temperature of 120° C. under a pressure of 100 p.s.i. A gas containing 20% molecular oxygen in nitrogen was passed through the solution at a rate of 400 liters/hour and formic acid was fed to the reactor at a rate of 1.5 moles/hour along with 6 moles of acetic acid. Carbon dioxide was evolved at a rate of 1.4 moles/hour indicating that the formic acid was oxidized continuously. Acetic acid containing 1.5% formic acid was removed continuously along with the water produced. The formic acid concentration in the reactor was 2 to 2.5% and the water concentration was 4%–5%. Experiments using labelled $C_{14}$, using both labelled formic and acetic acids, indicated that 4% of the carbon dioxide was produced by oxidation of acetic acid.

EXAMPLE 2

100 mls. of a catalyst having the following composition in acetic acid

|   | Moles/liter |
|---|---|
| Palladous chloride | $5 \times 10^{-3}$ |
| Lithium chloride | 0.4 |
| Lithium acetate | 2.0 |
| Cupric acetate | 0.1 | was placed in a reactor equipped with a stirrer and maintained at a temperature of 150° C. under atmospheric pressure. Oxygen was passed through the solution at a rate of 20 liters per hour and 0.5 mole of formic acid was injected into the reactor through a septum with a hypodermic syringe. The rate of evolution of $CO_2$ was 0.1 mole/hour.

EXAMPLE 3

100 mls. of a catalyst containing $5 \times 10^{-3}$ moles/liter chloriridic acid and 2.0 moles/liter lithium acetate was placed in a reactor equipped with a stirrer and maintained at a temperature of 105° C. under atmospheric pressure. Oxygen was passed through the solution at a rate of 20 liters/hour and 0.5 mole formic acid was injected into the reactor. Carbon dioxide was evolved at a rate of 0.006 mole/hour.

We claim:

1. A process for the selective decomposition of formic acid in mixtures containing formic acid and acetic acid comprises contacting the mixture in liquid phase with molecular oxygen in the presence of a catalyst comprising a soluble carboxylate or halide of a platinum group metal and a redox system for preventing precipitation of said metal whereby the formic acid is selectively decomposed.

2. A process according to claim 1 in which the platinum group metal is palladium.

3. A process according to claim 2 in which the palladium compound is a palladous halide.

4. A process according to claim 1 in which the reaction is carried out in the presence of a base selected from carboxylates of ammonium, an alkali metal or an alkaline earth metal.

5. A process according to claim 4 in which the carboxylate is an acetate.

6. A process according to claim 1 in which a metal halide is also added to the reaction mixture.

7. A process according to claim 6 in which the metal halide is lithium or sodium chloride.

8. A process according to claim 1 in which the redox system is obtained with para-benzoquinone or 2-ethyl anthraquinone.

9. A process according to claim 1 in which the redox system is obtained with a cupric or ferric salt.

10. A process according to claim 9 in which the salt is an acetate.

11. A process according to claim 1 in which the platinum group metal compound is in a molar concentration of between $10^{-5}$ and $5 \times 10^{-3}$ and is selected from carboxylates and halides of palladium and the process is carried out at temperatures between 80° C. and 180° C.

References Cited

UNITED STATES PATENTS

| 3,303,020 | 2/1967 | Clement et al. | 260—597 |
| 3,384,659 | 5/1968 | Bate | 260—541 |

FOREIGN PATENTS

| 264,943 | 5/1963 | Australia. |
| 855,751 | 12/1960 | Great Britain. |

OTHER REFERENCES

Eley et al.: Adv. in Catalysis, 1963, pp. 100–103.

LORRAINE A. WEINBERGER, Primary Examiner

V. GARNER, Assistant Examiner